March 15, 1932.　　　W. A. RIDDELL　　　1,849,249

PHOTOGRAPHIC SHUTTER

Filed March 2, 1931　　　2 Sheets-Sheet 1

William A. Riddell,
Inventor,

March 15, 1932. W. A. RIDDELL 1,849,249
PHOTOGRAPHIC SHUTTER
Filed March 2, 1931 2 Sheets-Sheet 2
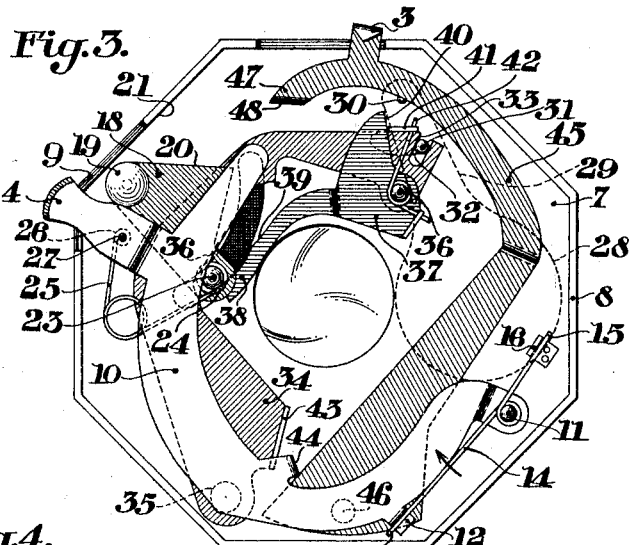
William A. Riddell,
Inventor,
Attorneys Patented Mar. 15, 1932

1,849,249

UNITED STATES PATENT OFFICE

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK

PHOTOGRAPHIC SHUTTER

Application filed March 2, 1931. Serial No. 519,425.

This invention relates to photography, and more particularly to photographic shutters. One object of the invention is to provide a simple, inexpensive type of photographic shutter. Another object is to provide a shutter which can be readily assembled and easily adjusted. Another object of my invention is to provide a simple type of shutter in which a master member is power driven in two directions. Another object of my invention is to provide a shutter in which the exposure lever is operated in one direction only for actuating the shutter. Another object of my invention is to provide suitable connections between the master member and the lever actuating the shutter blades to permit the trigger to be moved in only one direction for actuating the shutter and in a reverse direction for positioning the shutter parts for another exposure. Other objects will appear from the following specification, the novel points being particularly pointed out in the claims at the end thereof.

This shutter is for an improvement over the photographic shutter shown in my Patent No. 1,701,121, issued February 5, 1929. In the shutter shown in this patent, the exposure lever or trigger may be moved in one direction for making one exposure and then may be moved in an opposite direction for making a second exposure. While this is suitable for certain types of cameras, for other types of cameras it is preferable to have the trigger move in only one direction for making an exposure, and it is to this feature that the present invention is particularly directed.

Coming now to the drawings wherein like reference characters denote like parts throughout:

Figure 3 is a view similar to Figure 2 but with the parts in a different position;

Figure 4 is a fragmentary plan view of certain of the shutter operating parts with the master member in the position in which it lies after the completion of an exposure;

Figure 5 is a view similar to Figure 4, but with the parts in the position which they assume after an exposure has been made during the return movement of the master member to its starting position, and Figure 6 is a front plan view of the shutter shown in Figure 1 with the parts in the position for making a time exposure.

This shutter is of a simple type in which only two kinds of exposures can be made; one for instantaneous or snapshot exposures, and the other for exposures of different durations, that is, exposures in which the shutter blade is opened and then closed manually.

Figure 1:
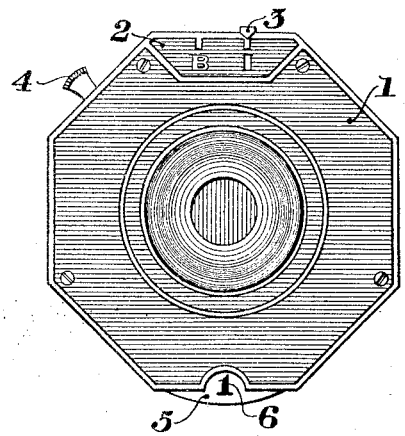
Figure 1 is a front plan view of a shutter constructed in accordance with and embodying the preferred form of my invention.

In accordance with Figure 1, the shutter may have shutter cover plate 1 with a scale at 2 and a pointer 3 adapted to move over the scale to indicate whether instantaneous or bulb exposures are to be made. "I" on the scale 2 indicates instantaneous exposures and "B" indicates bulb exposures.

The shutter may be equipped with the usual exposure lever or trigger 4 and the lower part of the shutter is here shown as being provided with a diaphragm plate 5 having a scale 6 to indicate the diaphragm opening in position behind the lens.

The shutter may be provided with the usual casing 7' having an upstanding flange 8 extending around the periphery thereof as is customary.

The trigger or exposure lever 4 consists of a handle portion which extends out through a slot 9 in the flange 8. This handle is attached to an arcuate shaped lever 10 which is pivoted at 11 to the plate 7 which may be a mechanism plate in casing 7'. Lever 10 also carries a bent arm 12 which is preferably engaged by one end 13 of a spring 14 encircling the pivot 11 and having the other end 15 held by a lug 16 in the position shown. This spring has a tendency to thrust the exposure lever in the direction shown by the arrow in Figure 2 until the operating handle 4 is brought into contact with the shoulder 17 at one end of the slot 9. In order to make an exposure, the handle 4 is thrust from the position shown in Figure 2 to the position shown in Figure 3, causing the handle 4 to travel through the slot 9 against the pressure of spring 14.

A master member 18 is pivotally mounted at 19 on plate 7. This master member is roughly triangular in shape, having a straight side 20 which is adapted to swing up against the side 21 of the shutter casing, and having an offset or extension 22 which carries a stud 23. This stud forms a cam follower as will be hereinafter more fully described.

The stud 23 supports one end 24 of a spring 25, the other end of which, 26, engages a stud 27 on the trigger. This spring is of the hairpin type and is adapted to be compressed by moving the trigger in one direction so that as the spring is placed under tension and released the master member 18 will be suddenly thrust in an opposite direction to that in which the shutter trigger moves. It will thus be seen that when the shutter lever is moved in either direction the master member is positively driven in a reverse direction. The trigger 4 is manually moved in one direction about its pivot 11 by an operator and if the trigger is then released it will return to its initial or starting position under the impulse of spring 14. Regardless of whether or not the trigger 4 is driven by spring power or manually, the master member 18 is driven in two different directions, so that the stud 23 will swing through an arcuate path under power each time the shutter trigger is moved.

In the preferred embodiment of my invention the shutter is of the one blade type. The shutter blade as shown in broken lines in Figure 2 at 28 and consists of a substantially circular plate having an arm or extension 29 which is pivoted at 30 to the plate 7. From arm 29 a pin 31 extends upwardly through the arcuate shaped slot 32. This pin engages a fork 33 on a lever 34 pivoted at 35 to the shutter plate 8, and is adapted to swing about the pivot a short distance when moved by the stud 23 of the master member 18, as will be more fully described hereinafter.

The lever 34 is provided with a cam surface 36 against which a cam follower in the form of stud 23 is adapted to travel, and the shape of the cam is such that as the master member 18 swings about its pivot 19, the lever 34 is moved back and forth upon its pivot 35 in such a manner that the pin 31 of the shutter blade 28 is moved to open and close the shutter. The shape of the cam is such that the blade 28 opens rapidly, remains open a fair proportion of the exposure and then closes rapidly. The time of an instantaneous exposure of approximately 1/25th of a second, has been found most desirable for this type of shutter.

The lever 34 carries an upstanding stud 36 upon which there is a plate 37. Plate 37 is provided with an arm 38 and this arm has on one side a cam surface 39. Plate 37 is also provided with an offset stop 40 adapted to contact with a cooperating stop 41 on the arm 34. Thus these two members normally limit the movement of the arm 38 in one direction upon its pivot 36. A spring 42 normally holds this part in the position shown in Figures 2, 3, and 4. In this position the cam surface 39 is spaced away from the cam surface 36 so as to form a slot for the cam follower 24 of substantially the same width as the stud 23.

In making an exposure the trigger 4 is pressed downwardly. This causes the compression of spring 25 and the actuation of master member 18. As master member 18 moves from the position shown in Figure 2 toward the position shown in Figure 4, it moves along the two cam surfaces described in the preceding paragraph. As perhaps best indicated in Figure 4, as the cam follower starts its movement, it contacts with the end of the arm 38, moving the lever 34 about its pivot 35 in a counter-clockwise direction.

As the cam follower moves to the position as shown in Figure 4, the cam follower slips along the two cam surfaces and causes the shutter lever 34 to swing about its pivot 35 in two directions, the degree of movement being sufficient for the fork 33 to oscillate the pin 31 which extends up from the arm 29 carrying the shutter blade 28. This back and forth movement of the shutter blade 28 makes an exposure.

After the exposure has been made, the trigger may be partially or entirely released so as to move in a reverse direction. This again tensions the spring 25 and causes a reverse movement of the master member 18. Normally this movement would again open and close the shutter blade 28.

However, since the arm 38 is pivoted at 36 to the lever 34, and since the mechanical advantage of the cam follower is considerably greater on this return movement than it was on the initial movement, the arm 38 is swung upon its pivot 36 against the pressure of spring 42; thus the lever 34 is not moved during this return movement.

Figure 2:
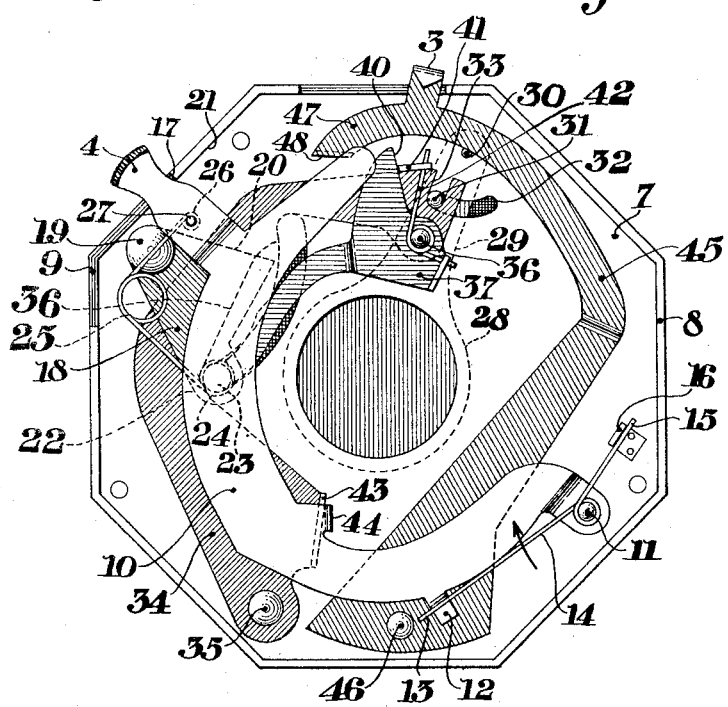
Figure 2 is an enlarged front plan view of the shutter shown in Figure 1, but with the shutter cover plate removed to expose the operating mechanism.

There is an additional safeguard against operating the shutter during the return movement of the master member. From reference to Figure 2 it will be seen that the lever 34 near its pivot 35 is provided with a flange 43 extending upwardly from lever 34. This flange lies in the path of and is adapted to contact with a downwardly extending flange 44 carried by the exposure lever 10. The normal position of these two cooperating lugs is shown in Figure 2 in which they are substantially in contact. The reason for these two lugs is that it serves to prevent accidental operation of the shutter leaf and to make the operation of the shutter more certain. The lugs assist in holding the lever 34 against being accidentally opened or closed through a jar to the shutter. They also make the action of the hinged arm 38 more certain during the return movement of the cam follower 23.

For instance, with the parts in the position shown in Figure 5, when the master member is returning to its initial position and the cam follower 23 is in contact with the cam 39, swinging arm 38 about its pivot 36, the cooperating lugs 43 and 44 are in contact. This is clearly shown in Figure 5.

If the spring 42 should be a little too stiff for the master member to readily move the arm 38 about the pivot 36 on the return movement, the tendency would normally be for the master member to also move the shutter lever 34, which would actuate the shutter blade 28 and thus spoil the picture. The cooperating lugs 43 and 44, however, prevent such movement. In Figure 5 it will be seen that the master member is just in a position to snap back in its original position, a portion of this movement having already been accomplished. By the time the shutter trigger 4 has returned to its initial position, the master member is just starting its movement. Consequently the cooperating lugs 43 and 44 arrive at the position shown in Figure 5 before the last half of the movement of the master member 18 takes place. The shutter is not, therefore, totally dependent upon the strength of spring 42 to eliminate accidentally opening the shutter blade 28 during the return movement of the master member.

Since it is of course necessary to move lever 34 about its pivot 35 in a clockwise direction to operate the shutter blade 12, it is first necessary to move the trigger 4 so that the cooperating lug 34 will be moved away from direct contact with the lug 43. The only way that the shutter blade 12 can be moved is to first move the trigger 4.

In order to make time exposures, the setting lever 3 is moved from the position shown in Figure 1 to that in which the pointer would lie over the scale 2 over the reference character "B", "B" standing for bulb exposure and meaning an exposure of short duration, as is well known in the photographic art.

When the lever 3 is moved to this position, arm 45 which carries the pointer 3 is also moved about its pivot 46. Arm 45 also carries an extension 47 with a downwardly turned edge 48. This edge is adapted to lie in the path of the edge 20 of the master member, as best shown in Figure 6 so that the movement of the master member in a counter-clockwise direction is limited. The limit of motion is arranged so that the cam follower 23 will stop at the position in which the shutter blade is fully opened. To close the shutter the trigger is released so that it may return to its initial position under the force applied by the spring 14. This causes the master member to return to its initial position.

By moving the pointer 3 to the position shown in Figure 1 over "I" on the scale 2, the shutter is again set for instantaneous exposures. This will move stop 40 from the path of the master member and permit the master member to swing until the straight edge 20 either touches or lies close to part 21 of the flange 8 which extends upwardly around the edge of the shutter gate.

From the standpoint of operation, the shutter is extremely simple. If an instantaneous exposure is desired, the pointer 3 is set at the proper indication on scale 2 and the trigger 4 moves downwardly into the slot 9 in shutter flange 8. This causes an instantaneous exposure to be made in the manner above described. By releasing the trigger 4 it is returned to its initial position by means of the spring 14 and the master member snaps back into its original position without, however, moving the shutter lever 34 since the arm 38 moves upon its pivot 36.

If, however, an exposure of longer duration is desired, the pointer 3 is set over indicator "B" on scale 2 and the shutter will remain open as long as the trigger is pressed into its lower extent of movement through lock 9.

Having thus described my invention, what I claim as new and desire to secure by Letters Patent is:

1. In a shutter, the combination of a trigger, with a master member and a spring operatively connecting both of these parts whereby the master member is power driven by the trigger, a shutter operating lever, interengaging parts on the master member and lever constituting a power drive for the latter when the former is moved in one direction, one of said interengaging parts comprising a pair of normally spaced relatively movable cams.

2. In a shutter, the combination of a trigger, with a master member and a spring operatively connecting both of these parts whereby the master member is power driven by the trigger, a shutter operating lever, interengaging parts on the master member and lever including a hinged member carried by the lever constituting a power drive for the lever when the master member is driven in one direction, said hinged member permitting said interengaging parts to idle without movement of the lever when the master member is driven in an opposite direction.

3. In a shutter, the combination of a trigger, with a master member and a spring operatively connecting both of these parts whereby the master member is power driven by the trigger, a shutter operating lever, interengaging parts on the master member and lever including a hinged member carried by the lever, a spring normally thrusting the hinged member in one direction whereby the lever may be driven through the master member when the latter moves in one direction and the hinged lever may be swung on its hinge against the tension of the spring without moving the lever when the master member is driven in an opposite direction.

4. In a shutter the combination of a shutter casing, and a trigger with a master member and a spring for operatively connecting these parts to move the master member by power through the spring at each movement of the trigger, said master member comprising a pivoted lever carrying a cam follower adapted to be swung in two directions through a fixed path, a shutter lever pivoted to the shutter casing including an arm pivoted to the lever, the lever and arm each having cam faces adapted to be engaged by the cam follower, and connections between the lever and arm constructed to permit the cam follower to drive the lever when moved in one direction, and to drive only the pivoted arm when the master member is driven in an opposite direction.

5. In a shutter the combination of a shutter casing, and a trigger with a master member and a spring for operatively connecting these parts to move the master member by power through the spring at each movement of the trigger, said master member comprising a pivoted lever carrying a cam follower adapted to be swung in two directions through a fixed path, a shutter lever pivoted to the shutter casing including an arm pivoted to the lever, the lever and arm each having cam faces adapted to be engaged by the cam follower, and connections between the lever and arm including cooperating lugs adapted to permit the cam follower to drive the lever when the cam follower is moved in one direction, and adapted to permit the cam follower to move only the pivoted arm when the cam follower is moved in an opposite direction.

6. In a shutter the combination of a shutter casing, and a trigger with a master member and a spring for operatively connecting these parts to move the master member by power through the spring at each movement of the trigger, said master member comprising a pivoted lever carrying a cam follower adapted to be swung in two directions through a fixed path, a shutter lever pivoted to the shutter casing including an arm pivoted to the lever, the lever and arm each having cam faces adapted to be engaged by the cam follower, and connections between the lever and arm including cooperating lugs adapted to permit the cam follower to drive the lever when the cam follower is moved in one direction, and adapted to permit the cam follower to move only the pivoted arm when the cam follower is moved in an opposite direction, and a spring for holding the cooperating lugs of the lever and pivoted arms together.

7. In a shutter the combination of a shutter casing, and a trigger with a master member and a spring for operatively connecting these parts to move the master member by power through the spring at each movement of the trigger, said master member comprising a pivoted lever carrying a cam follower adapted to be swung in two directions through a fixed path, a shutter lever pivoted to the shutter casing including an arm pivoted to the lever, the lever and arm each having cam faces adapted to be engaged by the cam follower, and connections between the lever and arm, including cooperating lugs and a spring tending to hold the cam faces in substantial contact with the cam follower, the location of the pivoted arm and spring being such that the arm cannot be moved on its pivot by the cam follower when the latter is driven in one direction as the lever has a mechanical advantage.

8. In a shutter the combination of a shutter casing, and a trigger with a master member and a spring for operatively connecting these parts to move the master member by power through the spring at each movement of the trigger, said master member comprising a pivoted lever carrying a cam follower adapted to be swung in two directions through a fixed path, a shutter lever pivoted to the shutter casing including an arm pivoted to the lever, the lever and arm each having cam faces adapted to be engaged by the cam follower, and connections between the lever and arm, including cooperating lugs and a spring tending to hold the cam faces in substantial contact with the cam follower, the location of the pivoted arm and spring being such that the arm cannot be moved on its pivot by the cam follower when the latter is driven in one direction as the lever has a mechanical advantage, and the arm alone may be moved by the cam follower when driven in an opposite direction in which direction the cam follower has a mechanical advantage over the arm and its spring.

9. In a photographic shutter the combination with a shutter casing and pivoted trigger, of a master member pivoted to a casing, a spring attached to the trigger and master member for driving the latter in two directions by movement of the trigger in two directions, a shutter blade, a lever for moving the shutter blade and connections between the master member and lever including two cam surfaces carried by the lever one movable with respect to the other for operating the shutter blade when the master member is driven in one direction only.

10. In a photographic shutter the combination with a shutter casing and pivoted trigger, of a master member pivoted to a casing, a spring attached to the trigger and master member for driving the latter in two directions by movement of the trigger in two directions, a shutter blade, a lever for moving the shutter blade and connections between the master member and lever including an arm movably mounted on the lever, cam surfaces on the arm and lever, and a cam follower on the master member, the parts being so arranged that the lever may be moved by the master member when the latter is driven in one direction, and the arm may be moved on the lever when the master member may be driven in an opposite direction.

11. In a photographic shutter the combination with a shutter casing and pivoted trigger, of a master member pivoted to a casing, a spring attached to the trigger and master member for driving the latter in two directions by movement of the trigger in two directions, a shutter blade, a lever for moving the shutter blade and connections between the master member and lever including an arm movably mounted on the lever cam surfaces on the arm and lever normally spaced apart to form a slot, a cam follower carried by the master member and adapted to engage the slot to drive the lever when the master member moves in one direction, said movably mounted arm permitting one cam to separate from the other whereby the cam follower may move in a reverse direction without moving said lever.

12. In a photographic shutter the combination with a shutter casing and pivoted trigger, of a master member pivoted to a casing, a spring attached to the trigger and master member for driving the latter in two directions by movement of the trigger in two directions, a shutter blade, a lever for moving the shutter blade and connections between the master member and lever including an arm hinged to said lever, cooperating stops on the arm and lever for defining a normal position of the latter, a spring tending to hold the stops in engagement, a stud carried by the master member and adapted to be driven between the hinged arm and lever in two directions, being adapted to engage the lever and move it when driven in one direction and being adapted to engage and move the hinged arm but not the lever when the master member is moved in an opposite direction.

13. In a photographic shutter, the combination with a shutter blade adapted to cover and uncover an exposure aperture, of means for moving the blade including a lever, a cam surface on the lever, a latch carried by the lever, a master member, a trigger and a hair pin spring adapted to move the master member through movement of the trigger, a pin on the master member adapted to drive the shutter lever through contact with the cam in moving in one direction, said hinged latch permitting said pin to move idly in the opposite direction, and cooperating parts on the trigger and lever adapted to contact whereby movement of the shutter blade is prevented when the trigger is in one position.

14. In a photographic shutter, the combination with a shutter blade adapted to cover and uncover an exposure aperture, of means for moving the blade including a lever, a cam surface on the lever, a latch carried by the lever, a master member, a trigger and a hair pin spring adapted to move the master member through movement of the trigger, cooperating parts on the trigger and lever adapted to contact and prevent movement of the latter when the trigger is in one position, a pin on the master member adapted to engage the shutter lever and latch, said engagement being adapted to drive the lever for operating the shutter blade when the trigger is moved in one direction, said cooperating parts on the trigger and lever preventing the movement of the lever and permitting the latch to swing when the trigger is moved in an opposite direction.

15. In a photographic shutter, the combination of a trigger adapted to move about a fixed pivot, and a spring for holding said trigger in a position of rest with a master member adapted to swing in a fixed path, a spring connecting the trigger and master member for positively driving the master member in opposite directions to that in which the trigger is moved, a shutter blade, and a lever for moving the shutter blade, a stud on the master member adapted to engage the lever for moving the shutter blade, cooperating contacts on the trigger and lever for preventing movement of the latter when the trigger is in a position of rest, said cooperating parts becoming spaced when said trigger is moved from its position of rest.

16. In a photographic shutter, the combination of a trigger adapted to move about a fixed pivot, and a spring for holding said trigger in a position of rest with a master member adapted to swing in a fixed path, a spring connecting the trigger and master member for positively driving the master member in opposite directions to that in which the trigger is moved, a shutter blade, and a lever for moving the shutter blade, a stud on the master member adapted to engage the lever for moving the shutter blade, a hinged arm on the lever adapted to also engage said lever engaging stud, cooperating contacts between the trigger and lever adapted to hold the latter against movement when the former is in the position of rest, said stud driving the lever when the cooperating parts are spaced by moving the trigger from its position of rest.

17. In a photographic shutter, the combination of a trigger adapted to move about a fixed pivot, and a spring for holding said trigger in a position of rest with a master member adapted to swing in a fixed path, a spring connecting the trigger and master member for positively driving the master member in opposite directions to that in which the trigger is moved, a shutter blade, and a lever for moving the shutter blade, a stud on the master member adapted to engage the lever for moving the shutter blade, a hinged arm on the lever adapted to also engage said lever engaging stud, cooperating contacts between the trigger and lever adapted to hold the latter against movement when the former is in the position of rest, said stud driving the lever when the cooperating parts are spaced by moving the trigger from its position of rest.

18. In a shutter, the combination with a trigger, of a shutter leaf, a lever for moving the shutter leaf, connections between the shutter leaf and lever, mechanism for operating the lever, and cooperating elements on the trigger and shutter lever preventing movement of the latter when the trigger is in one position.

19. In a shutter, the combination with a trigger adapted to move between a position of rest and a position to make an exposure, of a shutter leaf, a lever for moving the shutter leaf, connections between the shutter leaf and lever, mechanism for operating the lever, and a pair of cooperating lugs on the trigger and exposure lever adapted to lie in contact and prevent actuation of the shutter leaf when the trigger is in its position of rest.

20. In a shutter, the combination with a trigger adapted to move between a position of rest and a position to make an exposure of a shutter leaf, a lever for moving the shutter leaf, connections between the shutter leaf, and lever, mechanism for operating the lever, and a pair of cooperating lugs on the trigger and exposure adapted to lie in contact and prevent actuation of the shutter when the trigger is in its position of rest, said trigger lug being adapted to move from said shutter lever lug when said trigger is moved to make an exposure.

Signed at Rochester, New York, this 17th day of February, 1931.

WILLIAM A. RIDDELL.